United States Patent [19]

Petrie

[11] 4,154,551

[45] May 15, 1979

[54] FLOW-THROUGH SWIVEL PIPE JOINT

[75] Inventor: Warren A. Petrie, New Orleans, La.

[73] Assignee: J. Ray McDermott & Co., Inc., New Orleans, La.

[21] Appl. No.: 841,104

[22] Filed: Oct. 11, 1977

[51] Int. Cl.² ............................................. F16L 1/04
[52] U.S. Cl. ............................... 405/159; 285/94;
285/156; 285/166; 285/271; 405/163
[58] Field of Search ............... 61/72.4; 37/72, 78;
285/94, 156, 166, 168, 261, 271, 278

[56] References Cited

U.S. PATENT DOCUMENTS

| 946,025 | 1/1910 | Elvin | 285/271 X |
|---|---|---|---|
| 1,268,387 | 6/1918 | Reed | 37/78 |
| 1,677,884 | 7/1928 | Connelly | 285/271 X |
| 1,914,736 | 6/1933 | Coutu | 285/271 |
| 2,879,649 | 3/1959 | Elliott | 61/72.4 |
| 3,479,061 | 11/1969 | Smookler et al. | 285/94 |
| 3,722,224 | 3/1973 | Roy | 61/72.4 |

FOREIGN PATENT DOCUMENTS 1007943  5/1952  France ........................ 285/271

Primary Examiner—Mervin Stein
Assistant Examiner—David H. Corbin
Attorney, Agent, or Firm—Arnold, White & Durkee

[57] ABSTRACT

A high pressure flow-through swivel joint is particularly adapted for connecting high pressure water lines to a jet sled in an underwater pipe burying apparatus. The joint includes mating spherical joint surfaces which allow pivotal adjustment during assembly, in order to compensate for construction tolerances. In addition, the mating spherical surfaces allow rotational freedom for the joint inlet passage when the pipe burying system is in operation.

7 Claims, 4 Drawing Figures

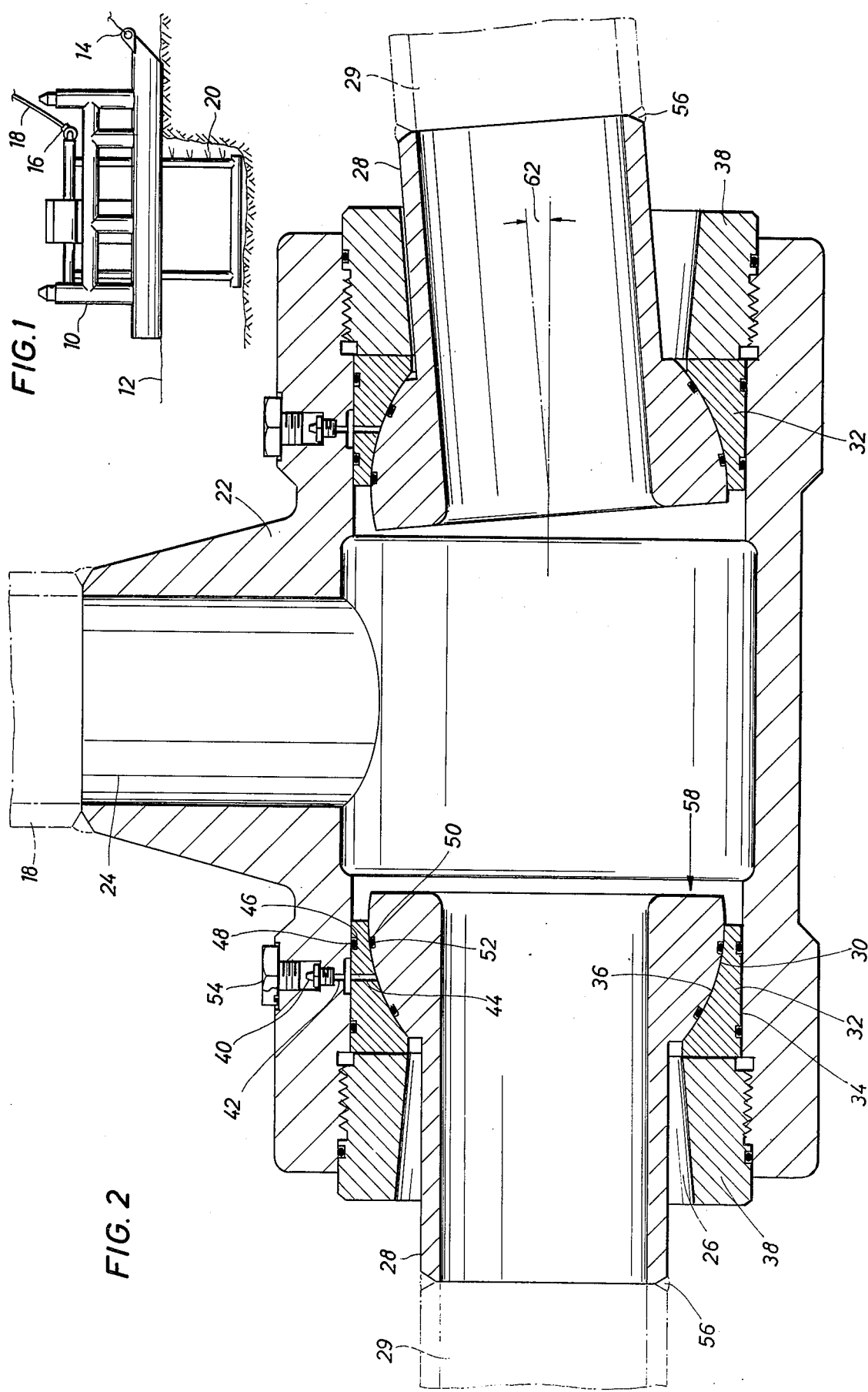

FLOW-THROUGH SWIVEL PIPE JOINT

BACKGROUND OF THE INVENTION

1. Field of the Invention

This invention relates to flexible pipe joints and more particularly to flow-through swivel pipe joints adapted to perform in an underwater high pressure environment.

2. Description of the Prior Art

Undersea pipe laying operations are important to a number of activities, particularly in the petroleum exploration and production industries. Many offshore oil wells, for example, require a line to be laid from the wellhead to a point at which the production from the well is gathered. One method used to bury a pipeline in a seabed involves towing a specially designed sled along the seabed by means of a tow line attached to a barge positioned on the surface of the water. The sled is positioned around and follows a pipeline which has previously been laid on the seabed. Pumps on the barge supply high pressure water to jetting nozzles mounted on the sled. The nozzles are directed towards the seabed so that the high pressure water stream digs a trench as the sled is towed along the seabed. The pipeline is progressively laid into the trench behind the sled as the trenching operation proceeds across the seabed. One example of such a pipe burying apparatus is disclosed in U.S. Pat. No. 4,041,717.

A high pressure water line is used to convey water from the barge pumps to the jet nozzles on the sled. Because a large amount of relative motion is normally experienced between the sled on the seabed and the barge on the surface of the water, some means of imparting flexibility to the high pressure connection between the barge and the sled should be provided in the system. The water lines themselves may be constructed of flexible material. In addition, it has been found desirable to incorporate a flexible pipe joint into the system to connect the high pressure line to the jet nozzles at the sled. This pipe joint typically includes an inlet passage, which is connected to the high pressure water line from the barge, and two outlet passages, each of which is connected to a conduit through which the high pressure water is conveyed to the jet nozzles.

The performance requirements of such a joint are demanding. It must be tightly sealed so that the high pressure water flowing through the joint may not escape, but the joint must be relatively friction free so as to retain flexibility under severe conditions without experiencing an abnormally short usuable life span. The durability of such a joint is especially important because of the remote undersea location in which it is used, with the consequently high cost of replacing such a joint. These requirements are further complicated by the corrosive salt water environment in which such joints normally are operated.

Flexible joint designs which are adapted to operate under high internal pressure are known in the art. Some such designs utilize a spherical ball and socket type design to give the joint the desired freedom of movement. Such joints typically have pressure balancing devices and are preloaded by using some means to apply opposing forces which clamp the joint around the spherical ball element. The complicated design of such joints, however, makes them unsatisfactory when used in an undersea pipe burying apparatus of the type described above. Such joints typically exhibit an excessive amount of friction in motion, resulting in an abnormally short life span.

Other high pressure joint designs utilize ball bearings in the joint to counteract the adverse effects of a high amount of friction. It has been found, however, that the use of such joints introduces an excessive cost into the pipe burying system. The two outlet passages for such joints are in axial alignment and require that the fixed outlet conduits on the jet sled, to which the joint is connected, also be in axial alignment within close tolerances. It has been found that maintaining these close tolerances during construction of the jet sled is difficult and costly.

Consequently, there is a need for a simple, reliable, and economical flow-through swivel pipe joint design which may be used in high pressure applications.

SUMMARY OF THE INVENTION

A flow-through swivel joint is provided for connecting an inlet line to a pair of fixed, approximately coaxial outlet conduits. The swivel joint includes a body member which defines an inlet passage for connection to an inlet line and a pair of outlet passages whose longitudinal axes are aligned and perpendicular to the longitudinal axis of the inlet passage. An elongate member is positioned within each outlet passage of the body member. Each elongate member has an internal tubular passage for communication with a fixed outlet conduit. A convex spherical surface is disposed proximate one end of each elongate member. A socket member is slidably mounted within each outlet passage and has an internal concave spherical surface which makes mating contact with no more than the outward facing portion of the spherical surface of the corresponding elongate member. A retaining means is provided for slidably fixing the socket members within the outlet passages, thereby retaining the elongate members within the outlet passages.

In a more specific embodiment of the invention, circumferential grooves, which contain sealing rings, are provided on the movable surfaces of the joint, with grease fittings included to provide lubrication to the moving parts of the joint.

It is therefore a feature of this invention to provide a flow-through swivel pipe joint particularly adapted for use in an underwater pipe burying apparatus.

It is another feature of this invention to provide a flow-through swivel pipe joint which exhibits pivotal freedom of movement to facilitate assembly and reduce costs of construction where the components to which the joint is connected cannot be aligned exactly without undue expense.

It is an additional feature of this invention to provide a flow-through swivel pipe joint which may be preloaded to facilitate its use under high pressure conditions.

It is also a feature of this invention to provide a flow-through swivel pipe joint, the inlet of which is rotatable about the longitudinal outlet axis in operation.

It is another feature of this invention to provide a flow-through swivel pipe joint which is self-sealing under high internal pressure conditions.

BRIEF DESCRIPTION OF THE DRAWINGS

A more specific depiction of the invention summarized above is illustrated in the appended drawings, which form a part of the specification. The drawings, however, illustrate only a typical embodiment and should not be considered to limit the scope of the invention.

IN THE DRAWINGS

FIG. 1 is a pictorial representation of the operating environment in which the flow-through swivel joint is utilized.

FIG. 2 is a plan view in partial section of a flow-through swivel joint.

Figure 3:
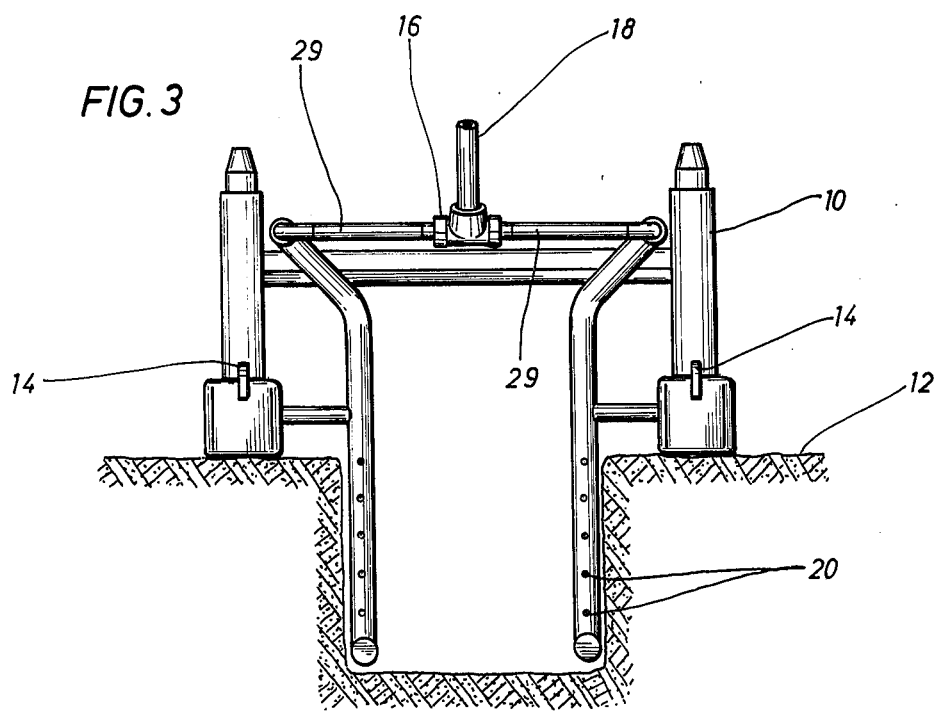

FIG. 3 is a frontal elevation of the jet sled shown in FIG. 1.

Figure 4:
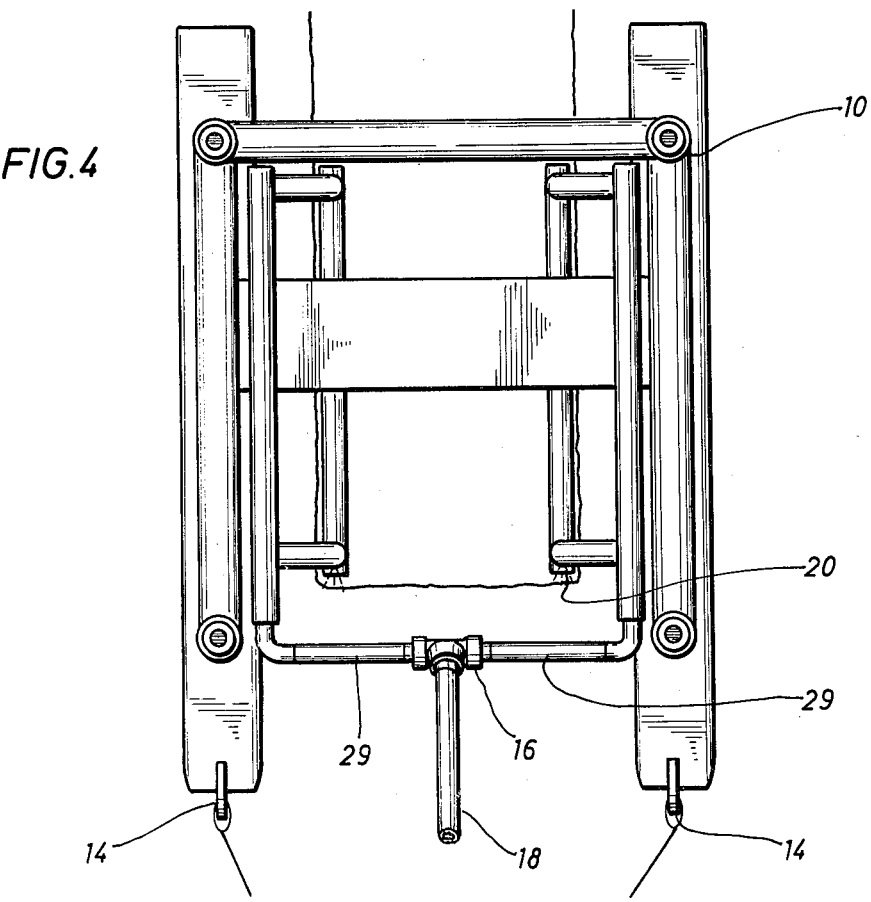

FIG. 4 is a plan view of the jet sled shown in FIG. 1.

DETAILED DESCRIPTION OF THE PREFERRED EMBODIMENT

Referring to FIG. 1, the environment of use for the joint is shown in pictorial representation. A jet sled 10 is towed along the seabed 12 by a tow line 14 attached to a surface vessel (not shown). A flow-through swivel joint 16 is affixed to the sled 10 through two outlet conduits 29, shown in FIG. 2. A high pressure water line 18, providing high pressure water from pumps located on the surface vessel to a plurality of jets 20 on the jet sled, is attached to the inlet passage of swivel joint 16. High pressure water forced through the jets 20 digs a trench in the seabed for the pipeline to be buried.

FIGS. 3 and 4 provide additional views of the jet sled 10 shown in FIG. 1. The swivel joint 16 is affixed to the sled 10 through two outlet conduits 29, which are rigidly mounted with respect to the sled. As the high pressure water line 18 flexes and moves relative to the sled 10, the swivel joint 16 attached to line 18 allows the line to swivel with respect to the outlet conduits 29.

FIG. 2 is a plan view in partial section of the swivel joint of the invention. The flow-through swivel joint 16 includes a body member 22, a pair of elongate members 28, a pair of socket members 32, and a pair of retainer members 38. The inlet passage 24 of the joint is connected to the high pressure water line 18, and each elongate member 28 is connected to an outlet conduit 29, mounted on a jet sled. The outlet conduits 29 are schematically represented by dashed lines.

Although the components of only one of the two outlet portions of the joint will be discussed, it should be understood that the joint illustrated is symmetrical and that, consequently, the description applies equally well to the other outlet portion of the joint. Within the outlet passage 26 is positioned an elongate member 28. The elongate member 28 includes a tubular passage for the flow of fluid therethrough. The outer end of the elongate member 28 is adapted to be permanently affixed, as by welding, to an outlet conduit 29. Disposed on the outer surface of the inner end of the elongate member 28 is a convex spherical surface 30.

The socket member 32 provides a pre-loading adjustment for the joint and provides a bearing surface for the rotational and pivotal motion of the elongate member 28. The socket member 32 is slidably fitted within the outlet passage 26, having an outer cylindrical surface 34 corresponding to the inner cylindrical surface of the outlet passage 26. The inner surface 36 of the socket member 32 is concave spherical in shape. The surface 36 has the same radius of curvature as the convex spherical surface 30 on the elongate member 28, surfaces 30 and 36 thereby being adapted to make mating contact. It is important to note that the spherical surface 36 does not make contact with the innter portion of the spherical surface 30. This limitation is best understood by referring to the imaginary sphere which would be formed by completing surface 30 in all directions. The outer hemisphere of such a sphere may be defined as that hemisphere located on the outlet side of a plane which passes through the center of the sphere and is perpendicular to the longitudinal axis of the outlet passage 26. The spherical surface 36 must make contact with no more than the outer hemisphere of this imaginary sphere; that is, the surface 36 cannot contact any portion of the spherical surface 30 which is coextensive with the inner hemisphere corresponding to this outer hemisphere. This limitation is necessitated by the unique way in which this joint is attached within its operating environment and pre-loaded, as discussed below.

It can be seen that the mating contact between the surfaces 30 and 36 allows the elongate members 28 to freely pivot and rotate with respect to the body member 22. It should also be noted that, when the joint is installed in an environment in which the elongate members 28 are rigidly affixed to structure external of the joint, the body member 22, including the inlet passage 24, is free to rotate about the longitudinal axis of the outlet passages 26.

An externally threaded retainer member 38 screws into an internally threaded portion of the outlet passage 26, thereby retaining the socket member 32 within the outlet passage 26. When the elongate members 28 are each rigidly affixed to structure external of the joint, it can be seen that, as the retainer member 38 is screwed into the outlet passage 26, the wedging effect of the socket member 32 will tend to increase the force with which surface 36 contacts surface 30. In this manner, the pipe joint may be pre-loaded, so that initial pressurization within the joint will not leak out between the surfaces 30 and 36 nor between the surface 34 and the surface of outlet passage 26. When the joint is in operation, the internal fluid pressure acts against the elongate member 28, causing a force to be exerted in the direction of arrow 58. In this manner, the joint is made self-sealing under pressure, as a further means of preventing leakage of the high internal pressure through the movable portions of the joint.

A grease fitting 40 allows lubrication to be applied, through the passages 42 and 44 in the body member 22 and the socket member 32, respectively, to lubricate the bearing surface between the socket member 32 and the elongate member 28, and the sliding surface between the socket member 32 and the body member 22. Grooves 46 in the socket member 32 include seals 48 which provide grease seals to retain grease between the outlet of the body member 22 and the socket member 32. Grooves 50 in the spherical surface of the elongate member 28 include seals 52 which provide a grease seal to retain grease between the elongate member 28 and the socket member 32. A protective cap 54 covers the grease fitting 40 as a means of isolating the grease fitting from the external undersea environment in which the joint is utilized.

To assemble the joint for use in a pipe burying operation, the elongate members 28 are loosely fitted within the outlet passages 26 of the body member 22. The socket members 32 are then placed over the outer ends 56 of the elongate members 28 and slidably fitted within the outlet passages 26. The retainer members 38 are then placed over the outer ends 56 of the elongate members 28 and screwed into the threaded portions of the body member 22 a slight amount. With the joint thus loosely assembled, the outer ends 56 of the elongate members 28 are welded to the outlet conduits 29, which are fixed to the structure of the sled 10. The pivotal feature of the joint design is particularly useful at this point of the assembly. Although the longitudinal axes of the outlet passages 26 of the body member 22 are in coaxial alignment, the longitudinal axes of the outlet conduits 29 are ordinarily not in exact axial alignment, since this cannot be economically achieved with the acceptable construction methods for the sled 10. Since the elongate members 28 can pivot through an angle 62, however, each elongate member 28 may be aligned with its corresponding outlet conduit 29. The elongate members 28 are then welded to the outlet conduits 29. Assembly of the joint may then be completed by tightening the retainer members 38 to the desired torque to achieve proper preloading. Although the longitudinal axes of the elongate members 28 will thus be out of alignment with each other and with the longitudinal axis of the outlet passages 26 of the body member 22, the spherical surface contact between the elongate members 28 and the socket members 32 will permit the body member 22, including the inlet passage 24, to rotate. In operation, variations in the elevation of the seabed surface, ocean currents, wind, and other factors will combine to cause frequent changes in the vertical and horizontal distances separating the surface vessel and the sled 10 on the seabed. As has been shown and described herein, the swivel joint 16 may freely rotate, thereby accommodating these variations without undue wear on the joint itself or on the high pressure water line 18.

It is apparent that a divided flow swivel joint has been described which substantially encompasses the features, objects, and advantages described herein. Although the invention has been described in conjunction with this specific embodiment, it will be understood that the invention is not limited thereto, since many alternatives, modifications, and variations will be apparent to those skilled in the art. For example, a plurality of high pressure water lines may be provided for one sled, with multiple joints on the sled to provide connections between the water lines and the jets of the sled. Accordingly, it is intended that all such other forms of the invention fall with the spirit and scope of the apparatus as described herein.

What is claimed is:

1. In an apparatus for burying a pipeline in a seabed, of the type including:
   a sled equipped with jet nozzles adapted to direct a high pressure fluid stream at the seabed;
   a water line for conveying high pressure fluid to the sled; and
   first and second conduits mounted on the sled for conveying said fluid to said jet nozzles;
   an improved flexible joint for connecting said water line to said conduits, comprising:
   a body member defining an inlet passage and coaxial first and second outlet passages such that the longitudinal axes of the outlet passages are substantially perpendicular to the longitudinal axis of the inlet passage;
   a first elongate member adapted to be affixed to said first conduit and defining an internal passage which is adapted to communicate with said first conduit and with said first outlet passage;
   a second elongate member adapted to be affixed to said second conduit and defining an internal passage which is adapted to communicate with said second conduit and with said second outlet passage;
   a first retainer affixed to said body member for rotatably locating said first elongate member with respect to said body member, said retainer being adapted to transmit a force to said elongate member in an inward direction with respect to the center of said body member; and
   a second retainer affixed to said body member for rotatably locating said second elongate member with respect to said body member, said retainer being adapted to transmit a force to said elongate member in an inward direction with respect to the center of said body member.

2. The apparatus of claim 1 in which said flexible joint further comprises:
   a first convex spherical surface proximate an end of the first elongate member;
   a second convex spherical surface proximate an end of the second elongate member;
   a first socket member slidably retained within said first outlet passage by said first retainer, said member defining a concave spherical surface adapted to slidably contact said first convex spherical surface and thereby impart said inward force from said first retainer to said first elongate member; and
   a second socket member slidably retained within said second outlet passage by said second retainer, said member defining a concave spherical surface adapted to slidably contact said second convex spherical surface and thereby impart said inward force from said second retainer to said second elongate member.

3. The apparatus of claim 2 in which said flexible joint further comprises:
   a pair of circumferential grooves disposed upon the first and the second convex spherical surfaces, said grooves adapted to contain sealing rings;
   first and said grease fittings attached to said body member; and
   first and second passages within said body member communicating between said first and second grease fittings and said first and second convex spherical surfaces respectively, thereby permitting lubrication of said joint.

4. A flow-through swivel joint for connecting an inlet line to first and second fixed, approximately coaxial outlet conduits, comprising:
   a body member defining an inlet passage adapted for communication with the inlet line and defining coaxial first and second outlet passages such that the longitudinal axes of the outlet passages are substantially perpendicular to the longitudinal axis of the inlet passage;
   a first elongate member adapted to be affixed to said first conduit and defining an internal passage which is adapted to communicate with said first conduit and with said first outlet passage, said first elongate member including a first convex spherical surface proximate an end thereof;
   a second elongate member adapted to be affixed to said second conduit and defining an internal passage which is adapted to communicate with said second conduit and with said second outlet passage, said second elongate member including a second convex spherical surface proximate an end thereof;

a first socket member rotatably located with respect to said first outlet passage, said member defining a concave spherical surface adapted to slidably contact said first convex spherical surface and thereby impart a force to said first elongate member in an inward direction with respect to the center of said body member;

a second socket member rotatably located with respect to said second outlet passage, said member defining a concave spherical surface adapted to slidably contact said second convex spherical surface and thereby impart a force to said second elongate member in an inward direction with respect to the center of said body member;

a first retainer affixed to said body member for rotatably locating said first elongate member with respect to said body member, said retainer being adapted to transmit said force to said elongate member through said first socket member; and a second retainer affixed to said body member for rotatably locating said second elongate member with respect to said body member, said retainer being adapted to transmit said force to said elongate member through said second socket member.

5. The pipe joint of claim 4 in which said retainers are adapted to screw into threads provided within the outlet passages of the body member.

6. The pipe joint of claim 5 further comprising:

a pair of circumferential grooves disposed upon the first and second convex spherical surfaces, said grooves adapted to contain sealing rings;

first and second grease fittings attached to said body member; and first and second passages within said body member communicating between said first and second grease fittings and said first and second convex spherical surfaces respectively, thereby permitting lubrication of said joint.

7. The pipe joint of claim 4 in which the convex spherical surface of each elongate member defines a hemisphere which decreases in cross sectional diameter in an outward direction with respect to the center of said body member.

* * * * *